United States Patent
Zheng et al.

(10) Patent No.: US 11,606,121 B1
(45) Date of Patent: Mar. 14, 2023

(54) SYSTEMS AND METHODS OF MULTI-ANTENNA RADIO FOR WIRELESS COMMUNICATION

(71) Applicant: Meta Platforms Technologies, LLC, Menlo Park, CA (US)

(72) Inventors: Dong Zheng, Saratoga, CA (US); Qi Qu, Redmond, WA (US); Abhishek Kumar Agrawal, Bellevue, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/461,227

(22) Filed: Aug. 30, 2021

(51) Int. Cl.
| | |
|---|---|
| *H04B 7/0426* | (2017.01) |
| *H04B 7/024* | (2017.01) |
| *H01Q 1/27* | (2006.01) |
| *H04B 1/44* | (2006.01) |
| *H04L 1/06* | (2006.01) |
| *H04L 5/00* | (2006.01) |

(52) U.S. Cl.
CPC ............ *H04B 7/043* (2013.01); *H01Q 1/273* (2013.01); *H04B 1/44* (2013.01); *H04B 7/024* (2013.01); *H04L 1/06* (2013.01); *H04L 5/0023* (2013.01)

(58) Field of Classification Search
CPC .......... H01Q 1/00; H01Q 1/273; H01Q 1/276; H04B 1/38; H04B 1/385; H04B 1/40; H04B 1/44; H04B 7/024; H04B 7/04; H04B 7/043; H04B 2001/3855; H04B 2001/3861; H04B 2001/3866; H04B 2001/3872; H04L 1/06; H04L 5/0023; H04L 5/0025
USPC ........ 375/219, 220, 259, 260, 267; 370/334; 455/73, 78, 83, 84, 88
See application file for complete search history.

(56) References Cited

U.S. PATENT DOCUMENTS

| | | | |
|---|---|---|---|
| 2010/0093282 A1* | 4/2010 | Martikkala | H04B 17/21 455/63.4 |
| 2013/0149975 A1* | 6/2013 | Yu | H04B 7/0602 455/78 |

(Continued)

FOREIGN PATENT DOCUMENTS

EP 2622681 A1 8/2013

OTHER PUBLICATIONS

Invitation to Pay Additional Fees for International Application No. PCT/US2022/041774, dated Nov. 28, 2022, 8 pages.

*Primary Examiner* — Young T. Tse
(74) *Attorney, Agent, or Firm* — Foley & Lardner LLP

(57) ABSTRACT

Described embodiments provide devices and methods for directing portions of signals to reduce power consumption. A wearable device may comprise N antennas configured to wirelessly receive and/or transmit incoming and/or outgoing signals. The N antennas may be spatially disposed on the device to enable at least one of the N antennas to be clear from blockage by a body part of a user when the device is maintained or worn against the body part, wherein N is an integer value greater than or equal to 2. The wearable device may comprise N receive chains coupled to the N antennas via transmit-receive couplers, the N receive chains configured to process the incoming signals. The wearable device may comprise a transmit chain configured to generate the outgoing signals. The wearable device may comprise a RF controller circuitry configured to direct portions of the generated outgoing signals via the transmit-receive couplers to the N antennas.

19 Claims, 6 Drawing Sheets

300

(56) References Cited

U.S. PATENT DOCUMENTS

| | | | |
|---|---|---|---|
| 2016/0143558 A1* | 5/2016 | Chernokalov | G01S 7/40 600/430 |
| 2019/0044549 A1* | 2/2019 | Pillai | H04W 4/70 |
| 2020/0127698 A1* | 4/2020 | Cho | H04L 25/0226 |
| 2021/0320697 A1* | 10/2021 | Gopal | H04B 7/0608 |

* cited by examiner

SYSTEMS AND METHODS OF MULTI-ANTENNA RADIO FOR WIRELESS COMMUNICATION

FIELD OF THE DISCLOSURE

The present application generally relates to systems and methods for multi-antenna wearable devices, including but not limited to devices and methods for directing portions of outgoing signals to antennas that are spatially disposed to be clear from blockage.

BACKGROUND

Artificial reality such as a virtual reality (VR), an augmented reality (AR), or a mixed reality (MR) provides immersive experience to a user. In one example, a user wearing a head wearable display (HWD) can turn the user's head, and an image of a virtual object corresponding to a location of the HWD and a gaze direction of the user can be displayed on the HWD to allow the user to feel as if the user is moving within a space of artificial reality (e.g., a VR space, an AR space, or a MR space). Currently, certain HWDs and other devices are unable to address blockage/obstruction of an antenna of the device by a body part of the user. Furthermore, current radio architecture designs of such devices can be inefficient from a power consumption perspective.

SUMMARY

Various embodiments disclosed herein are related to devices and methods for directing, splitting, apportioning, and/or routing signals to N antennas, wherein the N antennas are spatially disposed and/or configured so that at least of subset of the N antennas can be clear from blockage by a body part of a user. In some embodiments of the present disclosure, for example, an energy/power-efficient radio design (e.g., a design of a radio-frequency (RF) controller circuitry) can direct, apportion, and/or divide an output (e.g., an outgoing signal) of at least one transmit (Tx) chain (e.g., outgoing signals generated by a single transmit chain) to reduce and/or decrease a power consumption of a wearable device (e.g., a wireless device, such as a head wearable device (HWD) and/or other wearable devices), while maintaining same or similar throughput and/or latency performance (as an implementation with multiple transmit chains) for instance. For instance, an RF controller circuitry can direct, apportion, and/or split the output of a single transmit chain into at least two streams/signals. In some embodiments, at least two antennas (e.g., N antennas) can wirelessly transmit, send, communicate, and/or broadcast the at least two streams/signals generated by the at least one transmit chain. As such, a wearable device with a single transmit chain can support generation and/or transmission of a plurality of outgoing signals using two or more antennas (e.g., spatially/physically disposed or arranged to be clear from blockage). Therefore, a number of transmit chains (and therefore a number/quantity of power amplifiers (PAs) of a transmit chain) in a wearable device can be reduced without decreasing data throughput and/or degrading latency, resulting in a reduction of power consumption by the wearable device.

Various embodiments disclosed herein are related to a wearable device for directing portions of outgoing signals to antennas that are spatially disposed to be clear from blockage (e.g., that at least a subset of the antennas are clear from the blockage). The wearable device may comprise N antennas, N receive chains coupled to the N antennas, a transmit chain, and/or a RF controller circuitry. The N antennas may be configured to wirelessly receive incoming signals and wirelessly transmit outgoing signals. The N antennas may be spatially disposed on the wearable device to enable at least one of the N antennas to be clear from blockage by a body part of a user when the wearable device is maintained or worn against the body part. In some embodiments, N can be an integer value that is greater than or equal to 2. The N receive chains may be coupled to the N antennas via transmit-receive couplers. The N receive chains may be configured to process the received incoming signals. The transmit chain may be configured to generate the outgoing signals. The RF controller circuitry may be configured to direct portions of the generated outgoing signals via the transmit-receive couplers to the N antennas for wireless transmission.

In some embodiments, a ratio of number of the transmit chain to number of the receive chains for the N antennas can include or correspond to 1:N. In some embodiments, a single power amplifier of the transmit chain may be configured to output the outgoing signals. The RF controller circuitry may be configured to receive the outgoing signals from the single power amplifier. In some embodiments, the RF controller circuitry may be configured to split the outgoing signals from a single power amplifier of the transmit chain into N portions to direct to the N antennas respectively for wireless transmission. In some embodiments, the RF controller circuitry may be configured to apportion the outgoing signals from a single power amplifier of the transmit chain into: a first portion to direct to a first of the N antennas for wireless transmission, and a second portion different from the first portion, to direct to a second of the N antennas for wireless transmission. In some embodiments, at least two of the N antennas may be located on opposite sides of at least one of: the wearable device or the body part. In some embodiments, at least two of the N antennas can be spaced apart from each other around at least a portion of the body part. In some embodiments, at least two of the N antennas may be spaced apart from each other along at least a curved portion of the body part.

In some embodiments, the wearable device may comprise M antennas different from the N antennas, M receive chains, another transmit chain, and another RF controller circuitry. The M antennas may be configured to wirelessly receive other incoming signals and wirelessly transmit other outgoing signals. The M antennas may be spatially disposed on the wearable device, wherein M is an integer value that is greater than or equal to 2. In some embodiments, the M receive chains may be coupled to the M antennas via other transmit-receive couplers, the M receive chains configured to process the received other incoming signals. In some embodiments, the another transmit chain may be configured to generate the other outgoing signals. In some embodiments, the another RF controller circuitry may be configured to direct portions of the generated other outgoing signals via the other transmit-receive couplers to the M antennas for wireless transmission. In some embodiments, the outgoing signals may be different from the other outgoing signals. In some embodiments, transmission of the outgoing signals can overlap in time with transmission of the other outgoing signals. In some embodiments, the wearable device may comprise at least one of: a pair of glasses, goggles, a phone, a tablet, a smartwatch, headphones, or a microphone. In some embodiments, the body part may comprise an arm, palm, wrist, finger, ankle, knee, hip, limb, waist, torso, chest, shoulder, neck, head or ear.

In one aspect, the present disclosure is directed to a method for directing portions of outgoing signals to antennas that are spatially disposed to be clear from blockage. The method can include incorporating N antennas into a wearable device to enable at least one of the N antennas to be clear from blockage by a body part of a user when the wearable device is maintained or worn against the body part, to wirelessly receive incoming signals and wirelessly transmit outgoing signals. In some embodiments, N may be an integer value that is greater than or equal to 2. The method may include coupling N receive chains to the N antennas via transmit-receive couplers, the N receive chains configured to process the received incoming signals. The method may include coupling a transmit chain, via a RF controller circuitry and the transmit-receive couplers, to the N antennas. The RF controller circuitry may be configured to direct portions of outgoing signals generated by the transmit chain, to the N antennas for wireless transmission.

In some embodiments, the method may include incorporating a single power amplifier in the transmit chain to output the outgoing signals to the RF controller circuitry. In some embodiments, the method may include configuring the RF controller circuitry to split the outgoing signals from the transmit chain, into N portions to direct to the N antennas respectively for wireless transmission. In some embodiments, the method may include configuring the RF controller circuitry to apportion the outgoing signals from the transmit chain into: a first portion to direct to a first of the N antennas for wireless transmission, and a second portion different from the first portion, to direct to a second of the N antennas for wireless transmission. In some embodiments, at least two of the N antennas may be located on opposite sides of at least one of: the wearable device or the body part. In some embodiments, at least two of the N antennas may be spaced apart from each other around at least a portion of the body part. In some embodiments, at least two of the N antennas may be spaced apart from each other along at least a curved portion of the body part.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Figure 1:
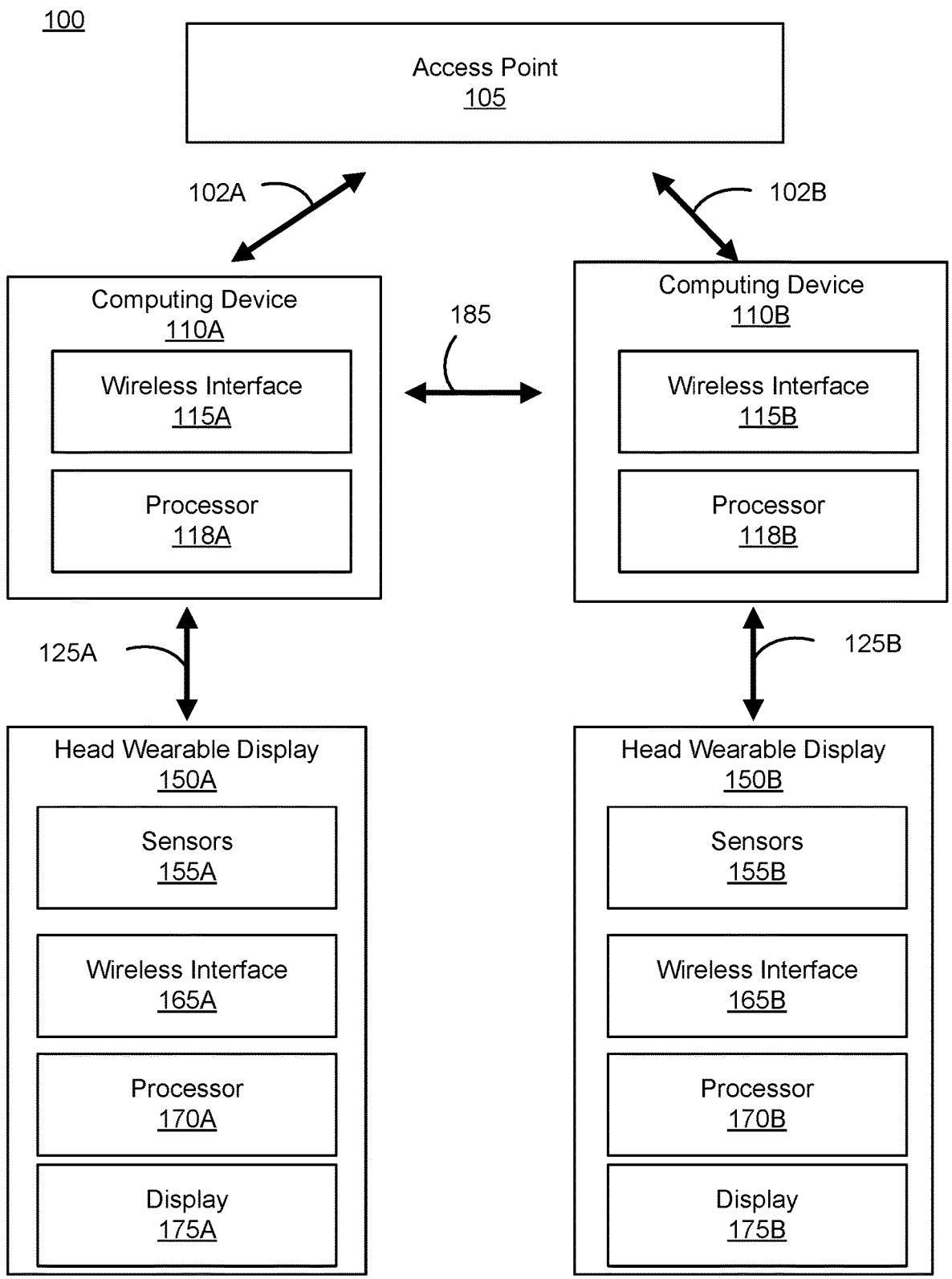
FIG. 1 is a diagram of a system environment including an artificial reality system, according to an example implementation of the present disclosure.

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

The devices and methods presented herein include a novel approach for directing, splitting, apportioning, and/or routing signals (e.g., generated by a transmit chain) to N antennas of a wearable device (e.g., a wireless device and/or a UE). The N antennas (e.g., N≥2) can be spatially disposed, located, and/or positioned on the wearable device to be clear from blockage, obstruction, and/or occlusion by a body part of a user (e.g., an arm, an ear, a head, and/or other body parts) when the wearable device is maintained or worn against the body part. Certain wearable devices, such as HWDs, may be unable to address blockage/obstruction by a body part, and/or can include a radio architecture design that lacks energy-efficiency. For instance, a HWD may have limited antenna efficiency, a reduced number of antenna ports, and/or a RF controller circuitry that includes a plurality of transmit chains, resulting in an increased consumption of power and/or signal imbalances for the HWD. The devices and methods described herein can decrease the power/resource consumption of the wearable device by at least 35% (e.g., 45, 55 or other percent) for instance, by enabling at least one of the N antennas to be clear from blockage by a body part of a user, and/or directing/splitting/routing signals generated by a transmit chain.

The present disclosure is directed to a novel energy-efficient radio architecture design for wearable devices (e.g., a pair of glasses, goggles, a phone, a tablet, a smartwatch, headphones, a microphone, and/or other wearable devices), while maintaining same or similar throughput and/or latency performance (as an implementation using a dedicated transmit chain for each transmission antenna) for instance. Certain wearable devices, such as HWDs, may suffer from imbalances in signal level (e.g., in the range of 10s of dB) caused by occlusion and/or blockage of at least one antenna of the wearable device. The occlusion and/or blockage can be caused by a body part of a user of the wearable device, such as a head of the user. In one example, a wearable device (e.g., a pair of wireless glasses) can have at least two antennas for transmitting/sending/broadcasting/communicating and/or receiving/obtaining data (e.g., transmitting outgoing signals and/or receiving incoming signals). Each antenna of the at least two antennas may be placed/disposed on an opposite end/side of the wearable device (e.g., on each leg of the glasses). However, a body part of the user (e.g., the head of the user) can occlude/block at least one antenna of the at least two antennas at any given moment. For instance, if a user of a HWD displaces/moves their head (and consequently the HWD) in a first direction (e.g., from left to right), the head can occlude (e.g., signal transmission or radiation path of) at least one antenna of the device (e.g., an antenna placed on a left leg of a HWD and/or an antenna placed on a right leg of a HWD). In such a scenario, at least one antenna of a wearable device (e.g., a pair of wireless glasses) with a 2×2 multiple-input and multiple-output (MIMO) radio design (e.g., two antennas on each side of HWD) can be occluded/blocked, for example, while another antenna can be in line of sight (LOS) with a receiver device.

In some embodiments, partial occlusion/blockage of the at least two antennas (e.g., blockage of at least one antenna) can cause (or result in) severe and/or significant imbalances in signal level between the exposed antennas (e.g., unblocked antennas) and hidden antennas (e.g., blocked/occluded antennas). Furthermore, current radio architecture designs (e.g., 2×2 MIMO designs and/or other radio designs) can be inefficient from a power consumption perspective (e.g., can cause excessive consumption of power and/or resources). For instance, the power consumption of a wearable device can increase with an increasing number, amount, and/or quantity of transmit chains corresponding to multiple antenna placements in a radio design of the wearable device. However, an increasing number of transmit chains may not result in (or cause) an increase of throughput gains to justify the increased power consumption, especially since one or more antennas in a wearable device can be occluded by a body part of a user (as previously discussed).

In some embodiments of the present disclosure, for example, an energy-efficient radio design (e.g., a design of a radio-frequency (RF) controller circuitry) can direct, apportion, and/or divide an output (e.g., an outgoing signal) of at least one transmit (Tx) chain (e.g., outgoing signals generated by the at least one transmit chain) to reduce and/or decrease a power consumption of a wearable device (e.g., a wireless device, such as a head wearable device (HWD) and/or other wearable devices), while maintaining same or similar throughput and/or latency performance (as an implementation with multiple transmit chains corresponding to the number of antennas) for instance. For instance, an RF controller circuitry can direct, apportion, and/or split the output of a single transmit chain into at least two streams/signals. In some embodiments, at least two antennas (e.g., N antennas) can wirelessly transmit, send, communicate, and/or broadcast the at least two streams/signals generated by the transmit chain. As such, a wearable device with a single transmit chain can support generation and/or transmission of a plurality of outgoing signals using two or more antennas (e.g., spatially disposed to be clear from blockage). Therefore, a number of transmit chains (and therefore a number/quantity of power amplifiers (PAs) of a transmit chain) in a wearable device can be reduced without decreasing data throughput and/or degrading latency performance, resulting in a reduction of power consumption by the wearable device.

In one example, a wearable device can include a transmit chain (e.g., at least one Tx chain), N receive (Rx) chains (e.g., Rx chains), N antennas (e.g., N≥2), and/or a RF controller circuitry. An output from the transmit chain (e.g., outgoing signal generated by the Tx chain) may be divided, directed, apportioned, routed, and/or split (e.g., by the RF controller circuitry) into N separate signals. The RF controller circuitry (e.g., via transmit-receive couplers) and/or the N antennas can transmit, send, and/or communicate the N separate signals (e.g., portions of generated outgoing signals) via the N antennas. For instance, the RF controller circuitry can provide portions of a generated outgoing signal (e.g., N separate signals of an outgoing signal) to the N antennas, wherein each antenna may transmit a particular portion of the outgoing signal.

In one example implementation of the present disclosure, incoming signals (e.g., Rx signals received by the N antennas) can be processed using MIMO and/or maximal-ratio combining (MRC) approaches. Certain wearable devices may include and/or have 4×2 MIMO radio designs, for instance, wherein the 4×2 MIMO radio designs can use at least four antennas (e.g., four T/R antennas) to transmit and/or receive incoming/outgoing signals. In such a configuration, a wearable device can include two transmit chains, four receive chains, and/or four antennas. The output from each of the transmit chains can be split, apportioned, directed, and/or divided (e.g., using RF controller circuitry) into at least two signals, and/or subsequently transmitted using the four antennas. As such, a reduced number of transmit chains (e.g., from four possible transmit chains to two transmit chains) can support transmission of different types of data/signals via a plurality of antennas. Therefore, the wearable device can become energy-efficient (e.g., due to the reduction in transmit chains) without a reduction in data throughput (e.g., due to data transmissions via a plurality of antennas) and/or latency performance (e.g., corresponding to the same data throughput). In some example implementations of the present disclosure, the output from a single transmit chain can be switched (instead of divided) between two or more antennas. For instance, based on (or according to) a strength of an incoming signal, the RF controller circuitry can determine to transmit the output from the transmit chain via one antenna from the N antennas (e.g., the antenna that received an incoming signal with the highest strength).

In view of the above discussion regarding directing and/or routing signals to N antennas spatially disposed to be clear from blockage, a process and/or system for performing said directing/routing/splitting may be beneficial, as further explained in the following passages. FIG. 1 is a block diagram of an example artificial reality system environment 100, in which outgoing signals can be directed via N antennas of a wearable device. In some embodiments, the artificial reality system environment 100 includes an access point (AP) 105, one or more HWDs 150 (e.g., HWD 150A, 150B), and one or more computing devices 110 (computing devices 110A, 110B; sometimes referred to as stage devices or consoles) providing data for artificial reality to the one or more HWDs 150. In some embodiments, a wearable device (for which portions of signals can be directed/apportioned according to the systems/methods presented herein) may include or correspond to the HWD(s) 150 and/or the computing device(s) 110 of the artificial reality system environment 100. In some embodiments, the wearable device (e.g., HWD 150) can communicate with a network via the computing/stage device(s) 110 and/or at least one AP 105.

The access point 105 may be a router or any network device allowing one or more computing devices 110 and/or one or more HWDs 150 to access a network (e.g., the Internet). The access point 105 may be replaced by any communication device (cell site). A computing device 110 may be a custom device or a mobile device that can retrieve content from the access point 105, and provide image data of artificial reality to a corresponding HWD 150. Each HWD 150 may present the image of the artificial reality to a user according to the image data. In some embodiments, the artificial reality system environment 100 includes more, fewer, or different components than shown in FIG. 1. In some embodiments, the computing devices 110A, 110B communicate with the access point 105 through wireless links 102A, 102B (e.g., interlinks), respectively. In some embodiments, the computing device 110A communicates with the HWD 150A through a wireless link 125A (e.g., intralink), and the computing device 110B communicates with the HWD 150B through a wireless link 125B (e.g., intralink). In some embodiments, functionality of one or more components of the artificial reality system environment 100 can be distributed among the components in a different manner than is described here. For example, some of the functionality of the computing device 110 may be performed by the HWD 150. For example, some of the functionality of the HWD 150 may be performed by the computing device 110.

In some embodiments, the HWD 150 is an electronic component that can be worn by a user and can present or provide an artificial reality experience to the user. The HWD 150 may be referred to as, include, or be part of a head mounted display (HMD), head mounted device (HMD), head wearable device (HWD), head worn display (HWD) or head worn device (HWD). The HWD 150 may render one or more images, video, audio, or some combination thereof to provide the artificial reality experience to the user. In some embodiments, audio is presented via an external device (e.g., speakers and/or headphones) that receives audio information from the HWD 150, the computing device 110, or both, and presents audio based on the audio information. In some embodiments, the HWD 150 includes sensors 155, a wireless interface 165, a processor 170, and a display 175. These components may operate together to detect a location of the HWD 150 and a gaze direction of the user wearing the HWD 150, and render an image of a view within the artificial reality corresponding to the detected location and/or orientation of the HWD 150. In other embodiments, the HWD 150 includes more, fewer, or different components than shown in FIG. 1.

In some embodiments, the sensors 155 include electronic components or a combination of electronic components and software components that detects a location and an orientation of the HWD 150. Examples of the sensors 155 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 155 detect the translational movement and the rotational movement, and determine an orientation and location of the HWD 150. In one aspect, the sensors 155 can detect the translational movement and the rotational movement with respect to a previous orientation and location of the HWD 150, and determine a new orientation and/or location of the HWD 150 by accumulating or integrating the detected translational movement and/or the rotational movement. Assuming for an example that the HWD 150 is oriented in a direction 25 degrees from a reference direction, in response to detecting that the HWD 150 has rotated 20 degrees, the sensors 155 may determine that the HWD 150 now faces or is oriented in a direction 45 degrees from the reference direction. Assuming for another example that the HWD 150 was located two feet away from a reference point in a first direction, in response to detecting that the HWD 150 has moved three feet in a second direction, the sensors 155 may determine that the HWD 150 is now located at a vector multiplication of the two feet in the first direction and the three feet in the second direction.

In some embodiments, the wireless interface 165 includes an electronic component or a combination of an electronic component and a software component that communicates with the computing device 110. In some embodiments, the wireless interface 165 includes or is embodied as a transceiver for transmitting and receiving data through a wireless medium. The wireless interface 165 may communicate with a wireless interface 115 of a corresponding computing device 110 through a wireless link 125 (e.g., intralink). The wireless interface 165 may also communicate with the access point 105 through a wireless link (e.g., interlink). Examples of the wireless link 125 include a near field communication link, Wi-Fi direct, Bluetooth, or any wireless communication link. Through the wireless link 125, the wireless interface 165 may transmit to the computing device 110 data indicating the determined location and/or orientation of the HWD 150, the determined gaze direction of the user, and/or hand tracking measurement. Moreover, through the wireless link 125, the wireless interface 165 may receive from the computing device 110 image data indicating or corresponding to an image to be rendered.

In some embodiments, the processor 170 includes an electronic component or a combination of an electronic component and a software component that generates one or more images for display, for example, according to a change in view of the space of the artificial reality. In some embodiments, the processor 170 is implemented as one or more graphical processing units (GPUs), one or more central processing unit (CPUs), or a combination of them that can execute instructions to perform various functions described herein. The processor 170 may receive, through the wireless interface 165, image data describing an image of artificial reality to be rendered, and render the image through the display 175. In some embodiments, the image data from the computing device 110 may be encoded, and the processor 170 may decode the image data to render the image. In some embodiments, the processor 170 receives, from the computing device 110 through the wireless interface 165, object information indicating virtual objects in the artificial reality space and depth information indicating depth (or distances from the HWD 150) of the virtual objects. In one aspect, according to the image of the artificial reality, object information, depth information from the computing device 110, and/or updated sensor measurements from the sensors 155, the processor 170 may perform shading, reprojection, and/or blending to update the image of the artificial reality to correspond to the updated location and/or orientation of the HWD 150.

In some embodiments, the display 175 is an electronic component that displays an image. The display 175 may, for example, be a liquid crystal display or an organic light emitting diode display. The display 175 may be a transparent display that allows the user to see through. In some embodiments, when the HWD 150 is worn by a user, the display 175 is located proximate (e.g., less than 3 inches) to the user's eyes. In one aspect, the display 175 emits or projects light towards the user's eyes according to image generated by the processor 170. The HWD 150 may include a lens that allows the user to see the display 175 in a close proximity.

In some embodiments, the processor 170 performs compensation to compensate for any distortions or aberrations. In one aspect, the lens introduces optical aberrations such as a chromatic aberration, a pin-cushion distortion, barrel distortion, etc. The processor 170 may determine a compensation (e.g., predistortion) to apply to the image to be rendered to compensate for the distortions caused by the lens, and apply the determined compensation to the image from the processor 170. The processor 170 may provide the predistorted image to the display 175.

In some embodiments, the computing device 110 is an electronic component or a combination of an electronic component and a software component that provides content to be rendered to the HWD 150. The computing device 110 may be embodied as a mobile device (e.g., smart phone, tablet PC, laptop, etc.). The computing device 110 may operate as a soft access point. In one aspect, the computing device 110 includes a wireless interface 115 and a processor 118. These components may operate together to determine a view (e.g., a FOV of the user) of the artificial reality corresponding to the location of the HWD 150 and the gaze direction of the user of the HWD 150, and can generate image data indicating an image of the artificial reality corresponding to the determined view. The computing device 110 may also communicate with the access point 105, and may obtain AR/VR content from the access point 105, for example, through the wireless link 102 (e.g., interlink). The computing device 110 may receive sensor measurement indicating location and the gaze direction of the user of the HWD 150 and provide the image data to the HWD 150 for presentation of the artificial reality, for example, through the wireless link 125 (e.g., intralink). In other embodiments, the computing device 110 includes more, fewer, or different components than shown in FIG. 1.

In some embodiments, the wireless interface 115 is an electronic component or a combination of an electronic component and a software component that communicates with the HWD 150, the access point 105, other computing device 110, or any combination of them. In some embodiments, the wireless interface 115 includes or is embodied as a transceiver for transmitting and receiving data through a wireless medium. The wireless interface 115 may be a counterpart component to the wireless interface 165 to communicate with the HWD 150 through a wireless link 125 (e.g., intralink). The wireless interface 115 may also include a component to communicate with the access point 105 through a wireless link 102 (e.g., interlink). Examples of wireless link 102 include a cellular communication link, a near field communication link, Wi-Fi, Bluetooth, 60 GHz wireless link, or any wireless communication link. The wireless interface 115 may also include a component to communicate with a different computing device 110 through a wireless link 185. Examples of the wireless link 185 include a near field communication link, Wi-Fi direct, Bluetooth, or any wireless communication link. Through the wireless link 102 (e.g., interlink), the wireless interface 115 may obtain AR/VR content, or other content from the access point 105. Through the wireless link 125 (e.g., intralink), the wireless interface 115 may receive from the HWD 150 data indicating the determined location and/or orientation of the HWD 150, the determined gaze direction of the user, and/or the hand tracking measurement. Moreover, through the wireless link 125 (e.g., intralink), the wireless interface 115 may transmit to the HWD 150 image data describing an image to be rendered. Through the wireless link 185, the wireless interface 115 may receive or transmit information indicating the wireless link 125 (e.g., channel, timing) between the computing device 110 and the HWD 150. According to the information indicating the wireless link 125, computing devices 110 may coordinate or schedule operations to avoid interference or collisions.

The processor 118 can include or correspond to a component that generates content to be rendered according to the location and/or orientation of the HWD 150. In some embodiments, the processor 118 includes or is embodied as one or more central processing units, graphics processing units, image processors, or any processors for generating images of the artificial reality. In some embodiments, the processor 118 may incorporate the gaze direction of the user of the HWD 150 and a user interaction in the artificial reality to generate the content to be rendered. In one aspect, the processor 118 determines a view of the artificial reality according to the location and/or orientation of the HWD 150. For example, the processor 118 maps the location of the HWD 150 in a physical space to a location within an artificial reality space, and determines a view of the artificial reality space along a direction corresponding to the mapped orientation from the mapped location in the artificial reality space. The processor 118 may generate image data describing an image of the determined view of the artificial reality space, and transmit the image data to the HWD 150 through the wireless interface 115. The processor 118 may encode the image data describing the image, and can transmit the encoded data to the HWD 150. In some embodiments, the processor 118 generates and provides the image data to the HWD 150 periodically (e.g., every 11 ms or 16 ms).

In some embodiments, the processors 118, 170 may configure or cause the wireless interfaces 115, 165 to toggle, transition, cycle or switch between a sleep mode and a wake up mode. In the wake up mode, the processor 118 may enable the wireless interface 115 and the processor 170 may enable the wireless interface 165, such that the wireless interfaces 115, 165 may exchange data. In the sleep mode, the processor 118 may disable (e.g., implement low power operation in) the wireless interface 115 and the processor 170 may disable the wireless interface 165, such that the wireless interfaces 115, 165 may not consume power or may reduce power consumption. The processors 118, 170 may schedule the wireless interfaces 115, 165 to switch between the sleep mode and the wake up mode periodically every frame time (e.g., 11 ms or 16 ms). For example, the wireless interfaces 115, 165 may operate in the wake up mode for 2 ms of the frame time, and the wireless interfaces 115, 165 may operate in the sleep mode for the remainder (e.g., 9 ms) of the frame time. By disabling the wireless interfaces 115, 165 in the sleep mode, power consumption of the computing device 110 and the HWD 150 can be reduced.

Figure 2:
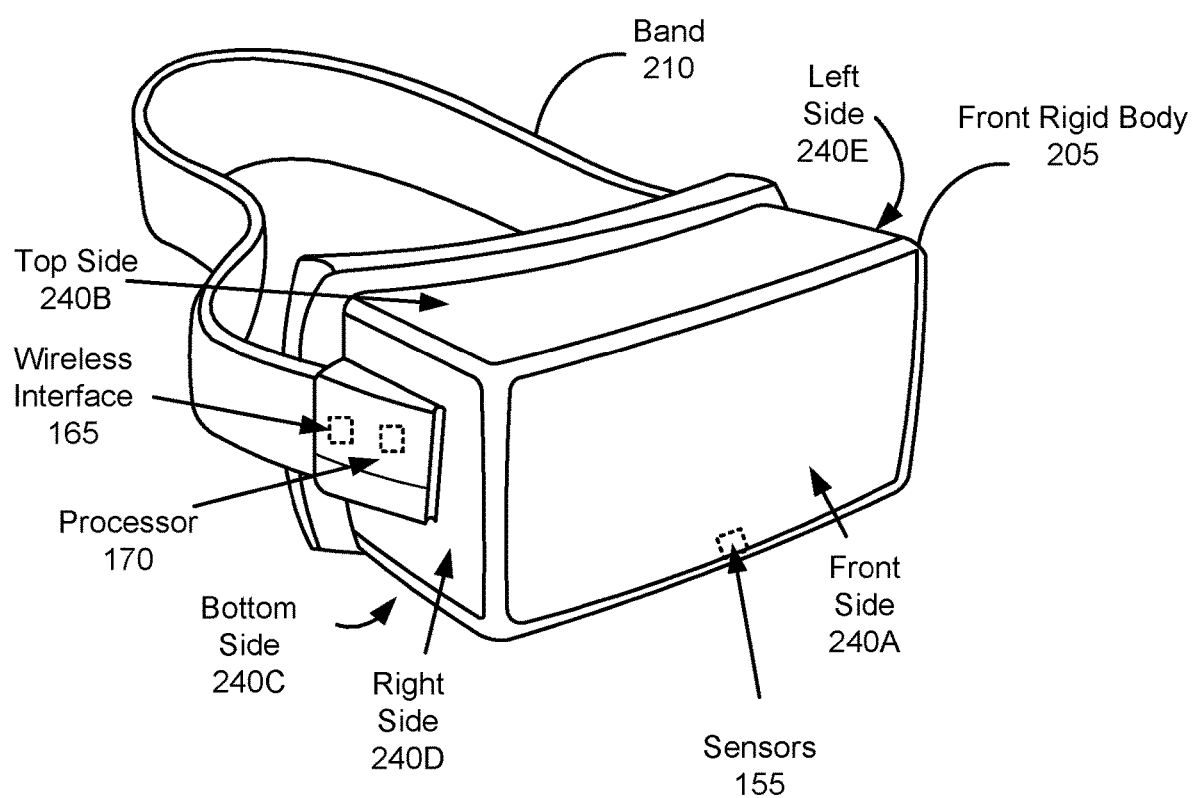
FIG. 2 is a diagram of a head wearable display, according to an example implementation of the present disclosure.

FIG. 2 is a diagram of a HWD 150, in accordance with an example embodiment. In some embodiments, the HWD 150 includes a front rigid body 205 and a band 210. The front rigid body 205 includes the display 175 (not shown in FIG. 2), the lens (not shown in FIG. 2), the sensors 155, the wireless interface 165, and the processor 170. In the embodiment shown by FIG. 2, the wireless interface 165, the processor 170, and the sensors 155 are located within the front rigid body 205, and may not visible to the user. In other embodiments, the HWD 150 has a different configuration than shown in FIG. 2. For example, the wireless interface 165, the processor 170, and/or the sensors 155 may be in different locations than shown in FIG. 2.

Figure 3:
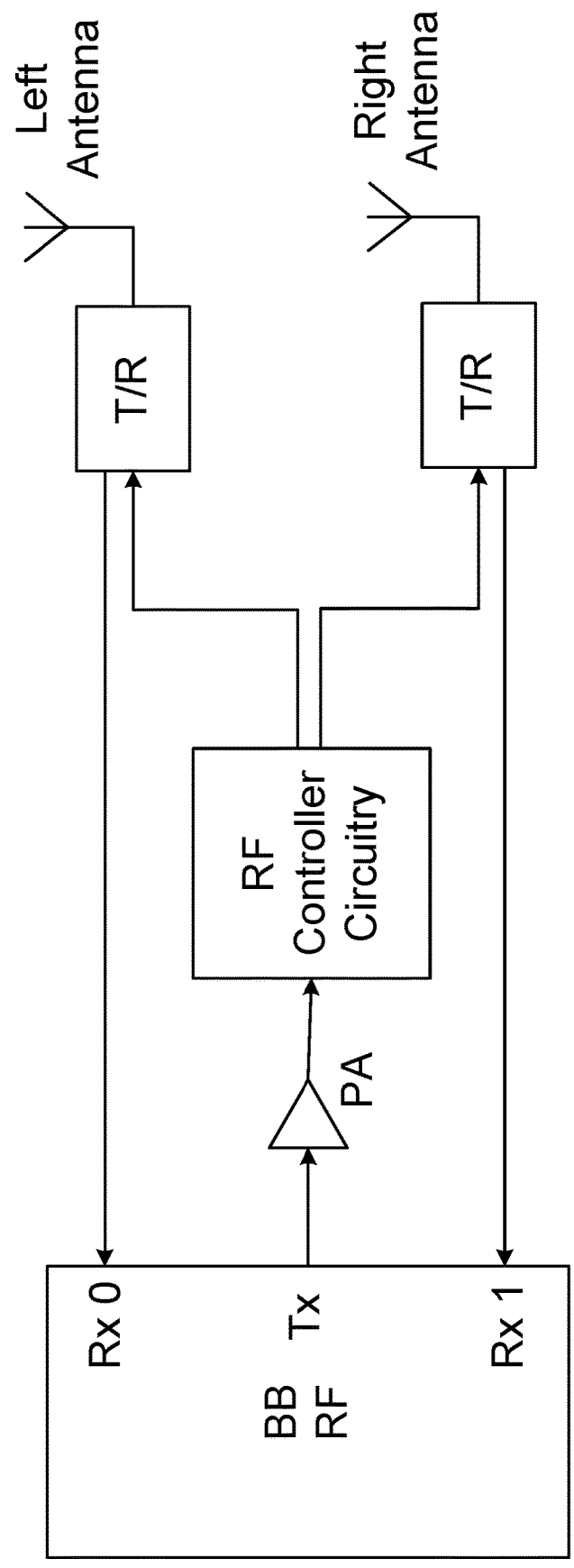
FIGS. 3-4 are diagrams of example embodiments of a wearable device for directing/apportioning outgoing signals via N antennas that are spatially disposed to be clear from blockage, according to example implementations of the present disclosure.
Figure 4:
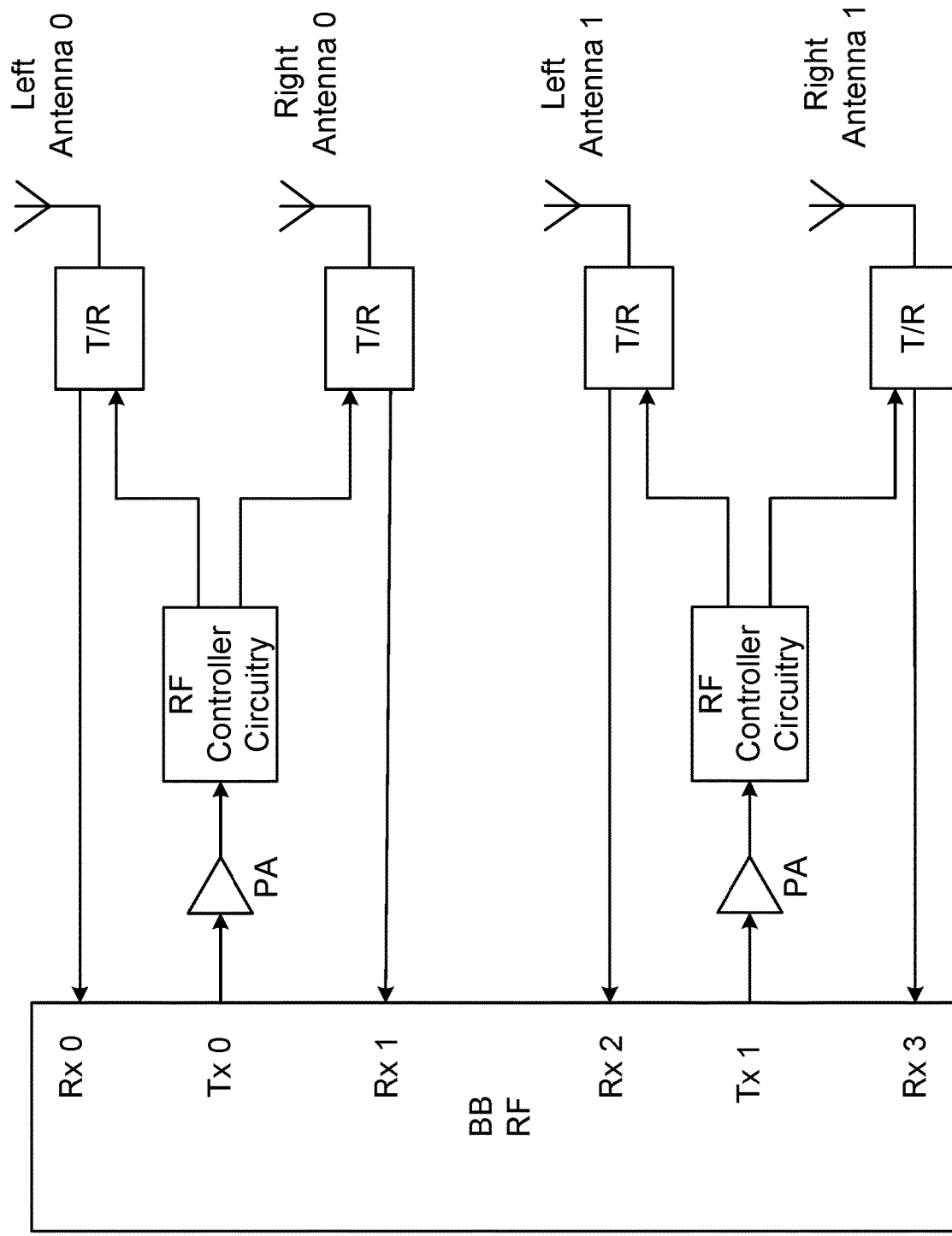

FIGS. 3-4 are block diagrams of example embodiments of a wearable device for directing and/or apportioning outgoing signals via N antennas that are spatially disposed to be clear from blockage, according to example implementations of the present disclosure. The wearable devices may include a baseband (BB) interface, one or more power amplifiers (PAs), one or more RF controller circuits/circuitry, transmit-receive couplers (e.g., T/R), and/or N antennas (e.g., Left Antenna 0/1, Right Antenna 0/1, Left Antenna, and/or Right Antenna). The PA(s) may be configured and/or designed to amplify, increase, and/or raise a power/strength of outgoing signals (e.g., multimedia data, augmented reality data, virtual reality data, and/or other types of signals), such that the outgoing signals can be successfully transmitted (e.g., via at least one of the N antennas) upon apportioning by RF controller circuitry. The RF controller circuitry can be configured and/or designed to direct and/or route portions of the generated outgoing signals via the transmit-receive couplers to the N antennas for wireless transmission. The transmit-receive couplers may be configured and/or designed to couple and/or connect N receive chains to the N antennas. The N antennas may be configured and/or designed to wireless receive and/or transmit incoming and/or outgoing signals. For instance, the N antennas may be configured to receive incoming signals from another wearable device (e.g., HWD 150), a computing device 110, and/or other devices. In some embodiments, the N antennas may be configured to send and/or transmit outgoing signals to other devices.

In some embodiments, a wearable device may include a 2×1 MIMO radio configuration (e.g., as seen in FIG. 3) and/or a 4×2 MIMO radio configuration (as seen in FIG. 4). The 2×1 MIMO radio configuration can include two antennas (e.g., Left Antenna and/or Right Antenna) for transmitting and/or receiving incoming/outgoing signals. In the 4×2 MIMO radio configuration, for instance, four antennas (e.g., Left Antenna 0/1, Right Antenna 0/1) can be used for transmitting and/or receiving incoming/outgoing signals. In the 2×1 MIMO configuration, a wearable device can include a single transmit chain, two receive chains, a single RF controller circuitry, and/or a single PA. In a 4×2 MIMO configuration, for instance, a wearable device can include two transmit chains, four receive chains, two RF controller circuits, and/or two PAs. In any of the two MIMO configurations, the output from each of the transmit chains (e.g., output from each RF controller circuitry) can be split, apportioned, directed, and/or divided (e.g., using RF controller circuitry) into at least two signals, and/or subsequently transmitted using the antennas. As such, a reduced number of transmit chains (e.g., from four/two possible transmit chains to two/one transmit chain(s)) can support transmission of different types of data/signals via a plurality of antennas.

Figure 5:
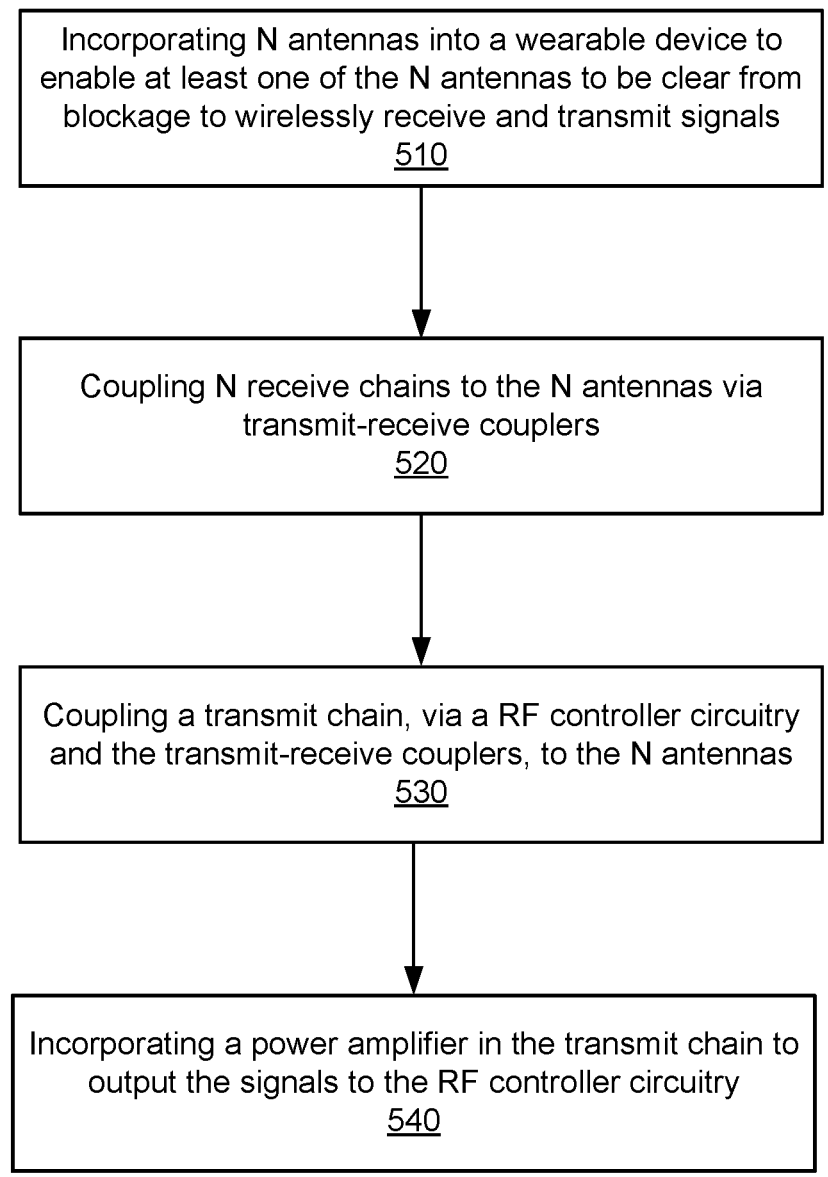
FIG. 5 is a flowchart of an example method for directing/apportioning outgoing signals of a wearable device via N antennas that are spatially disposed to be clear from blockage, according to an example implementation of the present disclosure.

FIG. 5 is a flow diagram of one embodiment of a process 500 for directing and/or apportioning outgoing signals of a wearable device (e.g., HWD 150) via N antennas that are spatially disposed to be clear from blockage, according to an example implementation of the present disclosure. The functionalities of the process 500 may be implemented using, or performed by, the components detailed herein in connection with FIGS. 1-4. In some embodiments, the process 500 can be performed by a HWD 150. In some embodiments, the process 500 can be performed by other entities, such as a computing device 110 (e.g., a first device 110A and/or a second device 110B). In some embodiments, the process 500 may include more, fewer, or different steps than shown in FIG. 5.

In brief overview, the process 500 can include incorporating N antennas into a wearable device to enable at least one of the N antennas to be clear from blockage to wirelessly receive and transmit signals (510). The process 500 may include coupling N receive chains to the N antennas via transmit-receive couplers (520). The process 500 may include coupling a transmit chain, via a RF controller circuitry and the transmit-receive couplers, to the N antennas (530). The process 500 may include incorporating a power amplifier in the transmit chain to output the signals to the RF controller circuitry (540).

Referring now to operation (510), and in some embodiments, N antennas (e.g., Rx antennas, Tx antennas, and/or Rx/Tx antennas) can be incorporated into a wearable device, such as a HWD 150, a pair of glasses, goggles, a phone, a tablet, a smartwatch, headphones, and/or a microphone. The N antennas can be incorporated/included/integrated to enable at least one of the N antennas to be clear from blockage/occlusion/obstruction (e.g., so as to be able to maintain a desired throughput and/or latency performance). The blockage may include or correspond to blockage by a body part of a user when the wearable device is maintained and/or worn against (e.g., mounted on, strapped/fastened to, or kept/held in a pocket or carrier against) the body part. For instance, a head of user can block one or more antennas of the N antennas when a HWD 150 (or other wearable devices) is worn by the user. In one example, a wearable device (e.g., a pair of wireless glasses) may comprise N antennas, such that at least one antenna is clear from blockage at any given moment. By incorporating N antennas into the wearable device (e.g., to enable at least one antenna to be clear from blockage), the wearable device may wirelessly receive/obtain and/or transmit/send incoming or outgoing signals (e.g., video (or other multimedia) data, augmented reality data, virtual reality data, and/or other types of signals) sufficiently/effectively via the at least one antenna (e.g., that is not blocked). In some embodiments, N may include or correspond to an integer value that is greater than or equal to two (e.g., N≥2).

Referring now to operation (520), and in some embodiments, N receive chains (e.g., Rx chains) may be coupled and/or otherwise connected to the N antennas. For instance, N receive chains can be coupled to the N antennas via one or more transmit-receive couplers and/or other components. The transmit-receive couplers can be configured for power monitoring, antenna monitoring, gain control, and/or electrical testing/measurement. The N receive chains may be configured to process, obtain, receive, and/or analyze the incoming signals. For instance, the N receive chains can be configured to amplify, filter, mix, attenuate, and/or detect incoming signals. In some embodiments, a receive chain can include one or more components (e.g., electronic and/or logical components) configured to process the incoming signals.

Referring now to operation (530), and in some embodiments, at least one transmit chain (e.g., Tx chain) may be coupled and/or otherwise connected to the N antennas. For example, a (e.g., single) transmit chain can be coupled/connected to the N antennas via a RF controller circuitry and/or the transmit-receive couplers. In some embodiments, the transmit chain may be configured to generate and/or create outgoing signals. For example, a transmit chain may be configured to amplify, filter, and/or otherwise process/generate the outgoing signals for wireless transmissions. In some embodiments of the present disclosure, a number/quantity of transmit chains of a wearable device can be reduced/decreased (e.g., compared to conventional radio designs) to reduce cost and/or power consumption of the wearable device, while maintaining the same or similar throughput and/or latency performance (as an implementation without a reduction in number of transmit chains) for instance. For instance, instead of incorporating a transmit chain for each antenna into the wearable device, a single transmit chain can be used/incorporated to generate/create outgoing signals for wireless transmissions via at least two antennas (or other numbers of antennas). In some embodiments, a RF controller circuitry of the wearable device can be configured to direct, apportion, and/or divide the outgoing signals. For instance, the RF controller circuitry may split and/or otherwise apportion the outgoing signals to the N antennas for wireless transmission.

Referring now to operation (540), and in some embodiments, a power amplifier (PA) can be incorporated, included, and/or integrated in the transmit chain. For instance, at least one PA (and/or other components) can be incorporated into each transmit chain of a wearable device to output and/or provide the outgoing signals to the RF controller circuitry. The PA can amplify, increase, and/or raise a power/strength of the outgoing signals, such that the outgoing signals can be successfully transmitted upon apportioning by the RF controller circuitry. As such, responsive to receiving the amplified outgoing signals, the RF controller circuitry can apportion, split, and/or divide the outgoing signals into N separate portions. Each separate portion of the outgoing signals may correspond to a particular antenna of the N antennas. Therefore, the RF controller circuitry can direct the portions of the outgoing signals to the N antennas for wireless transmission, e.g., without reducing data throughput in the outgoing signals. Indeed, in some embodiments of the present disclosure, a single transmit chain can generate outgoing signals to be transmitted via N antennas (e.g., rather than using a particular transmit chain for each antenna), while maintaining the same or similar throughput and/or latency performance. The PA of the single transmit chain may have an output power that is higher (but less than X times higher) than that of individual PAs for an implementation using X number of transmit chains, e.g., to achieve the same signal strength at a lower total output power.

In some embodiments, the RF controller circuitry can be configured to split, divide, and/or apportion the outgoing signals from a transmit chain. For instance, the RF controller circuitry may receive and/or obtain the outgoing signals (e.g., outgoing signals amplified by a PA) from a transmit chain. Responsive to receiving the outgoing signals, the RF controller circuitry may split (e.g., split into equal portions) the outgoing signals into N portions. As such, the RF controller circuitry may direct and/or route the N portions to the N antennas respectively (e.g., direct each portion of the outgoing signals to a corresponding antenna) for wireless transmission. In some embodiments, the RF controller circuitry can be configured to apportion the outgoing signals from the transmit chain. For instance, the RF controller circuitry may apportion the outgoing signals into at least a first portion and a second portion. The first portion can be directed/routed (e.g., by the RF controller circuitry) to a first of the N antennas for wireless transmission. The second portion can be directed/routed (e.g., by the RF controller circuitry) to a second of the N antennas for wireless transmission. In some embodiments, the RF controller circuitry may apportion the outgoing signals into N portions, wherein each of the N portions can be directed to a correspond antenna of the N antennas for wireless transmission.

In some embodiments, at least two of the N antennas can be located and/or placed on (substantially) opposite sides of at least one of: the wearable device or the body part. In some embodiments, at least two of the N antennas may be spaced apart from each other around at least a portion of the body part. In some embodiments, at least two of the N antennas may be spaced apart from each other along at least a curved portion of the body part. By locating the at least two antennas on opposite/different/separate sides and/or spaced apart from each other, and/or to achieve spatial diversity, the at least two antennas can be spatially disposed to enable the antenna(s) to be clear from blockage by a body part of a user, for example, to enable the same or similar throughput and/or latency performance (as compared to an implementation with a number of transmit chains corresponding to the number of antennas). In some embodiments, the body part may comprise an arm, palm, wrist, finger, ankle, knee, hip, limb, waist, torso, chest, shoulder, neck, head and/or ear of a user.

In some embodiments, M antennas (e.g., a second set of antennas) different from the N antennas (e.g., a first set of antennas) can be incorporated into a wearable device. The M antennas can be configured to wirelessly receive/obtain other incoming signals, and/or wirelessly transmit, send, broadcast, and/or communicate other outgoing signals (e.g., different from the outgoing signals associated to the N antennas). In a similar manner to the N antennas, the M antennas (e.g., Rx antennas, Tx antennas, and/or Rx/Tx antennas) can be spatially disposed on the wearable device to enable at least one antenna (from the M antennas) to be clear from (or otherwise avoid) blockage by a body part of the user. In some embodiments, M may include or correspond to an integer value that is greater than or equal to 2. In some embodiment, M receive chains (e.g., Rx chains) may be coupled and/or otherwise connected to the M antennas. For instance, M receive chains can be coupled to the M antennas via other transmit-receive couplers and/or other components. The transmit-receive couplers can be configured for power monitoring, antenna monitoring, gain control, and/or electrical testing/measurement. The M receive chains may be configured to process, obtain, receive, and/or analyze the other incoming signals. For instance, the M receive chains can be configured to amplify, filter, mix, attenuate, and/or detect other incoming signals (e.g., different from the incoming signals associated to the N antennas).

In some embodiments, another transmit chain (e.g., Tx chain) may be coupled and/or otherwise connected to the M antennas. For example, another transmit chain can be coupled/connect to the M antennas via another RF controller circuitry and/or other transmit-receive couplers. In some embodiments, the another transmit chain may be configured to generate and/or create the other outgoing signals. In some embodiments, another RF controller circuitry of the wearable device can be configured to direct, apportion, and/or divide the other outgoing signals. For instance, the another RF controller circuitry may split and/or otherwise apportion the other outgoing signals. Responsive to splitting/apportioning the other outgoing signals, the another RF controller circuitry can direct/route portions of the other outgoing signals via the other transmit-receive couplers to the M antennas for wireless transmission.

Figure 6:
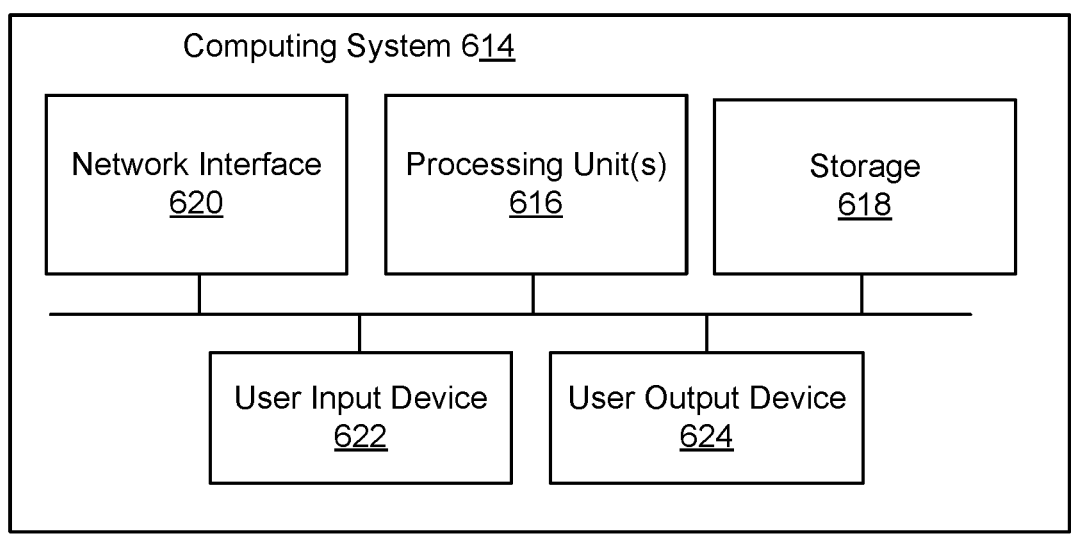
FIG. 6 is a block diagram of a computing environment, according to an example implementation of the present disclosure.

Various operations described herein can be implemented on computer systems. FIG. 6 shows a block diagram of a representative computing system 614 usable to implement the present disclosure. In some embodiments, the computing device 110, the HWD 150 or both of FIG. 1 are implemented by the computing system 614. Computing system 614 can be implemented, for example, as a consumer device such as a smartphone, other mobile phone, tablet computer, wearable computing device (e.g., smart watch, eyeglasses, head wearable display), desktop computer, laptop computer, or implemented with distributed computing devices. The computing system 614 can be implemented to provide VR, AR, MR experience. In some embodiments, the computing system 614 can include conventional computer components such as processors 616, storage device 618, network interface 620, user input device 622, and user output device 624.

Network interface 620 can provide a connection to a wide area network (e.g., the Internet) to which WAN interface of a remote server system is also connected. Network interface 620 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input device 622 can include any device (or devices) via which a user can provide signals to computing system 614; computing system 614 can interpret the signals as indicative of particular user requests or information. User input device 622 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 624 can include any device via which computing system 614 can provide information to a user. For example, user output device 624 can include a display to display images generated by or delivered to computing system 614. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 624 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 616 can provide various functionality for computing system 614, including any of the functionality described herein as being performed by a server or client, or other functionality associated with message management services.

It will be appreciated that computing system 614 is illustrative and that variations and modifications are possible. Computer systems used in connection with the present disclosure can have other capabilities not specifically described here. Further, while computing system 614 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A wearable device, comprising:
   N antennas configured to wirelessly receive incoming signals and wirelessly transmit outgoing signals, the N antennas spatially disposed on the wearable device to enable at least one of the N antennas to be clear from blockage by a body part of a user when the wearable device is maintained or worn against the body part, wherein N is an integer value that is greater than or equal to 2;
   N receive chains coupled to the N antennas via transmit-receive couplers, the N receive chains configured to process the received incoming signals;
   a transmit chain configured to generate the outgoing signals; and
   a radio-frequency (RF) controller circuitry configured to split each outgoing signal of the outgoing signals to direct portions of the generated outgoing signals via the transmit-receive couplers to the N antennas for wireless transmission.

2. The wearable device of claim 1, wherein a ratio of number of the transmit chain to number of the receive chains for the N antennas is 1:N.

3. The wearable device of claim 1, wherein:
   a single power amplifier of the transmit chain is configured to output the outgoing signals; and
   the RF controller circuitry is configured to receive the outgoing signals from the single power amplifier.

4. The wearable device of claim 3, wherein the RF controller circuitry is configured to split the outgoing signals from the single power amplifier of the transmit chain into N portions to direct to the N antennas respectively for wireless transmission.

5. The wearable device of claim 3, wherein the RF controller circuitry is configured to apportion the outgoing signals from the single power amplifier of the transmit chain into: a first portion to direct to a first of the N antennas for wireless transmission, and a second portion different from the first portion, to direct to a second of the N antennas for wireless transmission.

6. The wearable device of claim 1, wherein at least two of the N antennas are located on opposite sides of at least one of: the wearable device or the body part.

7. The wearable device of claim 1, wherein at least two of the N antennas are spaced apart from each other around at least a portion of the body part.

8. The wearable device of claim 1, wherein at least two of the N antennas are spaced apart from each other along at least a curved portion of the body part.

9. The wearable device of claim 1, further comprising:
M antennas different from the N antennas, configured to wirelessly receive other incoming signals and wirelessly transmit other outgoing signals, the M antennas spatially disposed on the wearable device, wherein M is an integer value that is greater than or equal to 2;
M receive chains coupled to the M antennas via other transmit-receive couplers, the M receive chains configured to process the received other incoming signals;
another transmit chain configured to generate the other outgoing signals; and
another RF controller circuitry configured to direct portions of the generated other outgoing signals via the other transmit-receive couplers to the M antennas for wireless transmission.

10. The wearable device of claim 9, wherein the outgoing signals are different from the other outgoing signals.

11. The wearable device of claim 10, wherein transmission of the outgoing signals can overlap in time with transmission of the other outgoing signals.

12. The wearable device of claim 1, wherein the wearable device further comprises at least one of: a pair of glasses, goggles, a phone, a tablet, a smartwatch, headphones, or a microphone.

13. The wearable device of claim 1, wherein the body part comprises an arm, palm, wrist, finger, ankle, knee, hip, limb, waist, torso, chest, shoulder, neck, head or ear.

14. A method comprising:
incorporating N antennas into a wearable device to enable at least one of the N antennas to be clear from blockage by a body part of a user when the wearable device is maintained or worn against the body part, to wirelessly receive incoming signals and wirelessly transmit outgoing signals, wherein N is an integer value that is greater than or equal to 2;
coupling N receive chains to the N antennas via transmit-receive couplers, the N receive chains configured to process the received incoming signals; and
coupling a transmit chain, via a radio-frequency (RF) controller circuitry and the transmit-receive couplers, to the N antennas, the RF controller circuitry configured to split each outgoing signal of the outgoing signals to direct portions of outgoing signals generated by the transmit chain, to the N antennas for wireless transmission.

15. The method of claim 14, comprising:
incorporating a single power amplifier in the transmit chain to output the outgoing signals to the RF controller circuitry.

16. The method of claim 14, comprising:
configuring the RF controller circuitry to apportion the outgoing signals from the transmit chain into: a first portion to direct to a first of the N antennas for wireless transmission, and a second portion different from the first portion, to direct to a second of the N antennas for wireless transmission.

17. The method of claim 14, wherein at least two of the N antennas are located on opposite sides of at least one of: the wearable device or the body part.

18. The method of claim 14, wherein at least two of the N antennas are spaced apart from each other around at least a portion of the body part.

19. The method of claim 14, wherein at least two of the N antennas are spaced apart from each other along at least a curved portion of the body part.

* * * * *